United States Patent
Chapou

[15] 3,675,683
[45] July 11, 1972

[54] MIXING FAUCET

[72] Inventor: Yves Chapou, 21 Cours Marigny, Vincennes, Val de Marne, France

[22] Filed: Oct. 28, 1970

[21] Appl. No.: 84,595

[30] Foreign Application Priority Data

Nov. 5, 1969 France..................................6937974

[52] U.S. Cl......................................137/637.4, 137/625.17
[51] Int. Cl.................................F16k 11/02, F16k 31/60
[58] Field of Search..............137/636.2, 636.4, 636.3, 637.4, 137/637.1, 637.5, 456.2, 456.5, 456.6, 607, 625.17

[56] References Cited

UNITED STATES PATENTS

| 2,800,923 | 7/1957 | Russell | 137/636.2 |
| 3,285,278 | 11/1966 | Corlett | 137/454.2 |
| 3,342,214 | 9/1967 | Panerai et al. | 137/636.4 |

FOREIGN PATENTS OR APPLICATIONS 1,360,831 4/1964 France...............137/636.3

Primary Examiner—Henry T. Klinksiek
Attorney—Ernest G. Montague

[57] ABSTRACT

Warm water and cold water mixing faucet of the type comprising a rotary control plug provided with two gaskets having different inclinations in relation to the axis of said plug so that one gasket cuts off completely the cold water inlet while the other permits a maximum ingress of warm water, and vice-versa. In this faucet, these two gaskets consist of a single flange-shaped gasket comprising two portions having opposite inclinations, and surrounding the control plug in a zone registering with the warm water and cold water inlet orifices, disposed at a same level but in diametrically opposite positions. Said plug is formed with a lateral opening level with said orifices which communicates with an inner bore constituting the outlet duct for the mixed water.

3 Claims, 5 Drawing Figures

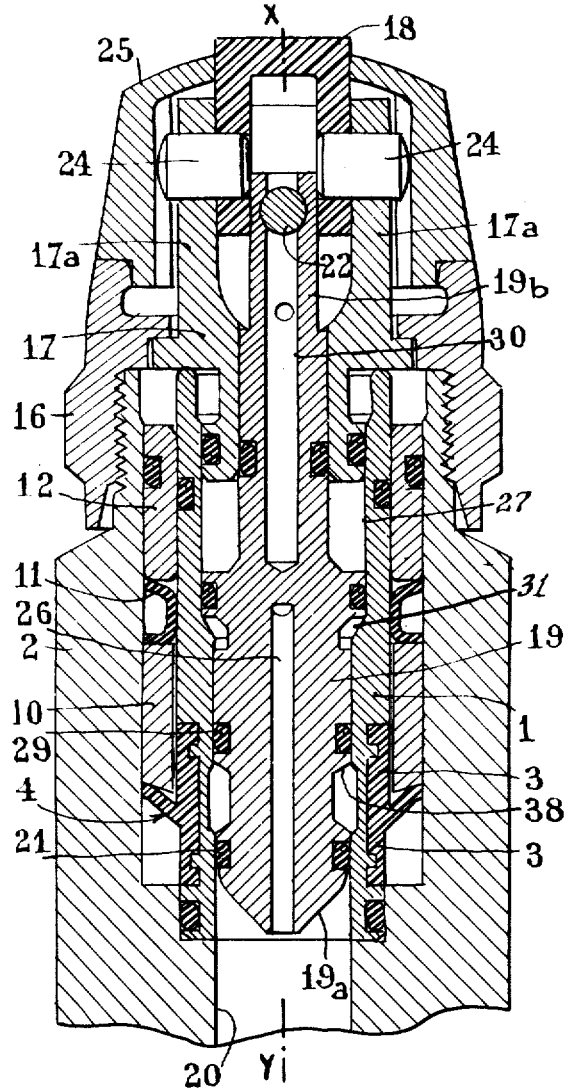
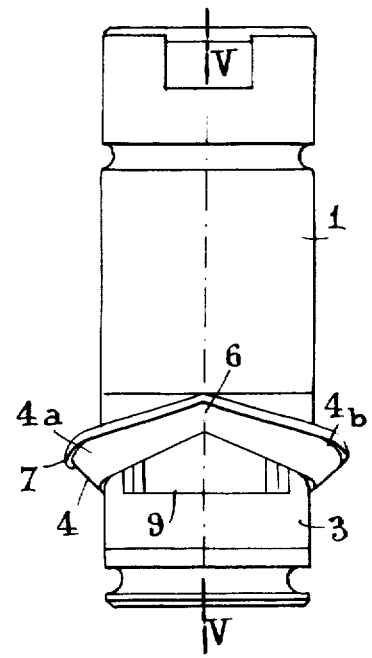
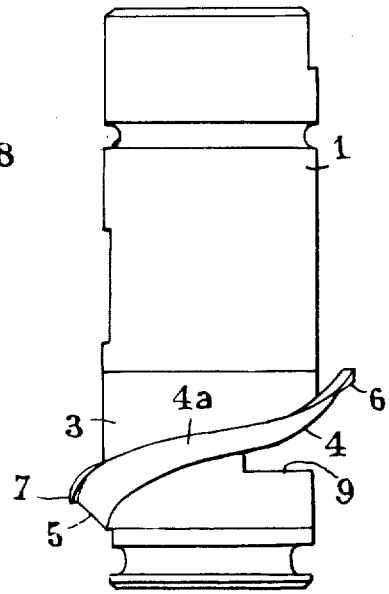

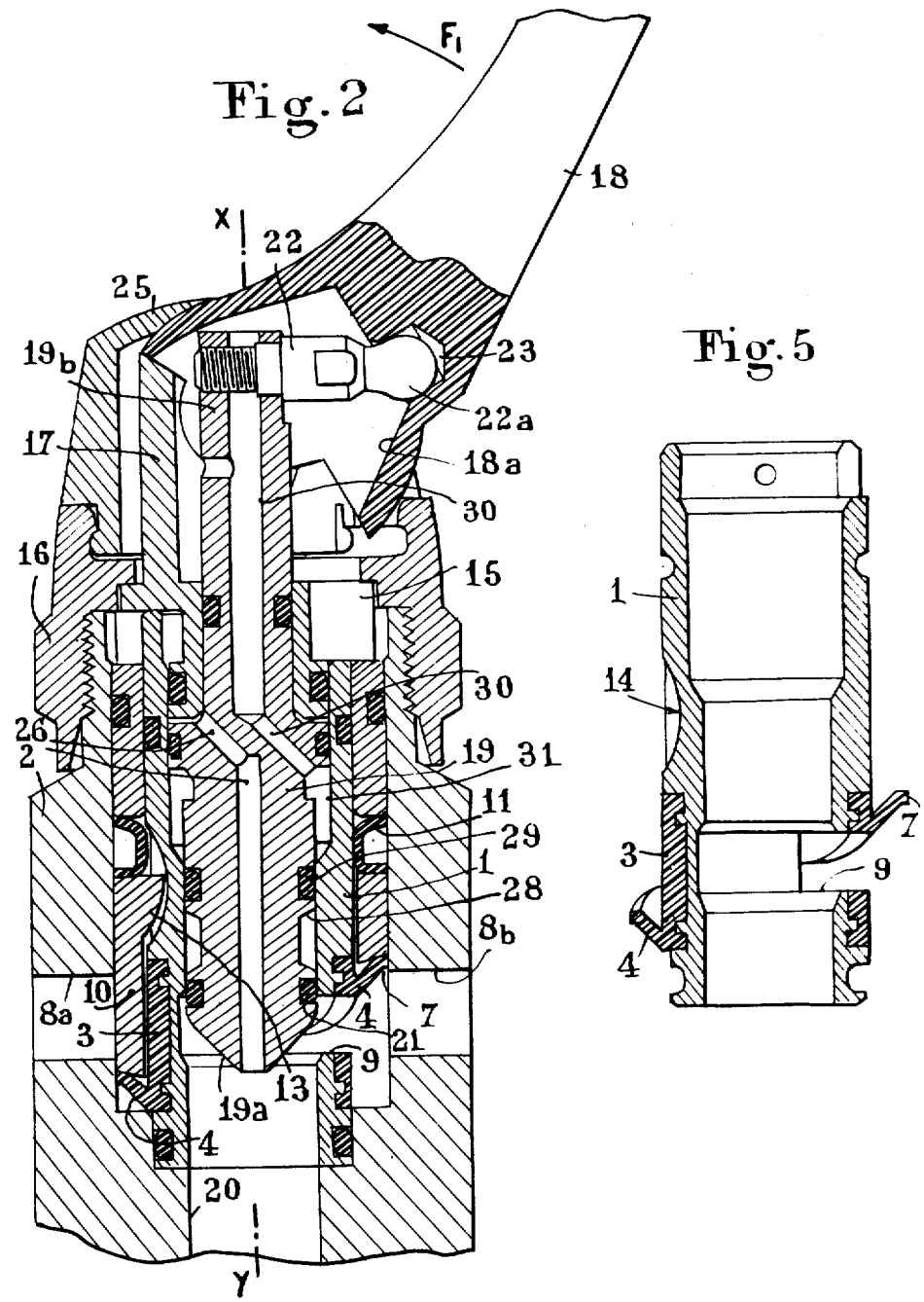

MIXING FAUCET

The present invention relates in general to faucets and has specific reference to mixing faucets for delivering water at the desired temperature, notably of the type described and illustrated in the French Patent 1,574,915.

The faucet according to the aforesaid patent comprises a rotary control plug having two gaskets in the form of inclined lips disposed in succession on the width of said plug and registering with two inlet orifices for cold water and warm water respectively, these orifices being also shifted in the axial direction on the wall of the faucet shell or socket. With due consideration for the mutual angular position of these two orifices, the aforesaid pair of lip-forming gaskets carried by the control plug have a different inclination so that one gaskets shuts off completely the cold water inlet while the other gasket permits the maximum supply of warm water, and vice-versa.

The mixing faucet according to this invention further comprises means for adjusting the output of the mixed water delivered therefrom. These means comprise a valve member registering with the passages through which cold water and warm water flow out from the rotary plug towards the mixing chamber. This valve member is actuated by means of a rod slidably mounted in said rotary plug, a single and same control handle being provided for controlling independently the adjustment of the wold water and warm water proportions, and the magnitude of the mixed water output.

However, the faucet disclosed in the above-mentioned French Patent 1,574,915 has a relatively complicated structure making its manufacture more difficult while burdening unduly the final cost. Moreover, due to its particular arrangement, the operation of this faucet is not fully satisfactory.

It is therefore a first object of the present invention to provide a faucet of same type but wherein the various inconvenience set forth hereinabove are definitely eliminated. Moreover, this novel faucet incorporates a number of improvements intended for facilitating its manufacture and warranting a reliable and satisfactory operation.

The mixing faucet according to this invention is characterized in that the two gaskets controlling the warm water and cold water inlets are formed in two portions of opposite inclination of a same flange of plastic material surrounding the rotary control plug in the portion thereof registering with the warm water and cold water inlet orifices, these orifices disposed at the same level being diametrally opposite to each other; moreover, said plug comprises a lateral aperture substantially level with said orifices, which communicates with an inner bore constituting the outlet passage for the mixed water.

According to another feature characterizing this invention, the mixing faucet comprises a piston mounted for axial sliding movement within said control plug and having its end registering with the lateral opening of said plug whereby the axial movements of said piston modify the free cross-sectional passage area provided by this opening, the piston movement being controlled by a member actuated from the exterior.

However, other features and advantages of this invention will appear as the following description proceeds. This description is given by way of example with reference to the attached drawings in which:

FIGS. 1 and 2 are axial sectional views of the faucet according to this invention, taken along planes perpendicular to each other;

FIGS. 3 and 4 are elevational views of the rotary control plug of the faucet illustrated in FIGS. 1 and 2, these views being taken in directions perpendicular to each other, and FIG. 5 is a section taken along the line V—V of FIG. 3.

The mixing faucet according to this invention comprises a rotary plug 1 adapted to control the adjustment of the desired proportions of cold water and warm water delivered by the faucet. This plug is mounted in the faucet body 2 and adapted to rotate about its axis X—Y.

A substantially cylindrical insert 3 formed with a gasket-forming flange 4 constituting a flange-shaped rib is fitted on this plug 1. The flange 4 comprises two different portions 4a and 4b each surrounding one-half of the circumference of plug 1. These two complementary portions of flange 4 are inclined in opposite directions. In the example illustrated they correspond to two helical thread portions of opposite pitch. Therefore, these portions 4a and 4b meet at two cusps or points of reflection 5, 6 lying in a common axial and diametral plane.

The outer marginal portion of flange 4 comprises a flexible lip 7 engaging in a fluid-tight manner the inner surface of the bore of body 2. The insert 3 and its flange 4 are formed as a unit and consist of suitable resilient plastic material. The corresponding member may constitute an insert force-fitted on plug 1, but it is also possible to obtain this member by moulding same from plastic material or other suitable material directly on the plug 1.

The body 2 of the faucet illustrated comprises two orifices 8a and 8b (FIG. 2) constituting the warm water inlet and the cold water inlet, respectively. These orifices are diametrally opposite and lie at a same level with respect to the area or axial length covered by the two complementary portions 4a and 4b of flange 4, when the plug 1 is rotated. The shift existing between the two cusps or point of reflection 5 and 6 of flange 4 in the axial direction is greater than the dimension of said orifices 8a and 8b in the same direction.

Beneath the level of this flange 4 the plug 1 comprises an opening 9 adapted to permit the flow of cold and/or warm water through the axial bore of this plug. This opening 9 registers with the cusp or point of reflection 6 of flange 4.

As will be readily understood by those conversant with the art, the respective proportions of cold water and warm water depend on the angular orientation of this flange and therefore of control plug 1. In fact, according to this orientation, the cold water inlet passage and warm water inlet passage may be more or less open or uncovered by the two portions 4a and 4b of flange 4. Besides, in a predetermined position shown in FIG. 2 one of these inlet passages, i.e. the warm water passage, may be closed completely, while the other passage (cold water passage) is fully open, but of course in the position resulting from a 180° rotation of plug 1 the reverse is obtained.

To avoid any intercommunication between cold water and warm water above the plane of flange 4, an external socket 10 surrounding the plug 1 is provided. The lower edge of this socket 10 has a contour matching that of flange 4 and resiliently engages this flange at a flexible sealing lip formed on the outer peripheral edge thereof due to the pressure exerted by a resilient thrust member such as an elastic washer 11 disposed between the socket and a fixed ring 12.

The socket 10 is rotatably solid with plug 1 due to an internal projection 13 of said socket which engages a corresponding recess 14 formed in the outer surface of said plug. The fixed ring 12 is retained in position by a key 15 retained in turn by a nut 16 screwed on the body 2 of the faucet. The key 15 is rigid with a head 17 constituting the support of the control handle 18 of the faucet.

The mixed water output delivered by the faucet is adjusted by the tapered end 19a of a piston 19 slidably mounted in the inner bore of plug 1.

In fact, when the piston 19 is in its upper position, the tapered end 19a thereof uncovers the plug opening 9, thus permitting the flow of warm water and/or cold water into the corresponding end of the plug, towards the outlet duct 20 formed in the faucet body (see FIG. 2). However, it is only necessary to cause said piston to slide downwards to the position shown in FIG. 1 for closing completely the aforesaid outlet duct.

To this end, the corresponding piston end carries an O-ring 21 for sealing the joint between this piston and its bore. However, the tapered shape of the piston end 19a ensures a gradual closing of the outlet duct.

The two operations required for adjusting on the one hand the proportions of warm water and cold water and on the other hand the output of mixed water may be controlled by a same external control member, in this example the control handle 18.

The lower end of this handle is inserted between the two side members 17a of rotary head 17. Thus, by actuating the handle 18 the user can rotate this head about the axis X—Y, thus causing the rotation of plug 1 and therefore the desired adjustment of the warm water and cold water proportions.

However, the lower end of handle 18 is formed with a recess 18a receiving the upper end 19b of piston 19.

This end carries a perpendicular pivot pin 22 formed with an integral ball head 22a. This ball head 22a is fitted in a blind hole 23 formed in the bottom of recess 18a.

This handle 18 is pivotally mounted on a pair of trunnions 24, also assisting in retaining the handle in position, which are in mutual alignment perpendicularly to the axis X—Y. Each trunnion engages simultaneously one or the other of the sides of the lower end of the handle and also one of the side members 17a of the strap carried by the rotary head 17.

It is thus possible to pivot the handle 18 in the direction of the arrow $F_1$ or in the opposite direction by pivoting the pair of trunnions 24. During this pivotal movement the handle 18 carries along the piston 19 through the ball head 22a and impresses a sliding movement thereto in one or other direction within the plug 1, thus ensuring the desired adjustment of the faucet water output.

A cap 25 covers the faucet assembly and comprises a central notch permitting the passage of the lower end of the aforesaid control handle 18. This cap 25 is retained in position by the nut 16.

It will be noted that the faucet according to this invention is so designed that its control handle 18 can remain in a stable manner in anyone of the positions selected by the user, irrespective of the water circulation pressure. To this end, there is firstly provided a passage 26 connecting the chamber 27 to that portion of the inner bore of plug 1 which is located downstream of piston 19. On the other hand, the cross-sectional passage area of annular chamber 27 is so calculated that it is equal to the cross-sectional area corresponding to the diameter of the O-ring 21 carried by the piston end. This piston has formed above this O-ring 21 a relatively wide annular groove 28 adapted to register with the opening 9 of plug 1 when the piston is moved to its outlet closing position. The two ends of this groove merge into the outer surface of piston 19 by means of tapered surfaces.

Moreover, the piston 19 carries another O-ring 29 similar to ring 21 but disposed on the other side of said groove 28. Besides, a duct 30 is formed in the piston body 19 for connecting the chamber 31 with the atmosphere. Thus, any residual air contained in this chamber can space freely during the upward movement of piston 19, and any interference with the free movement of this piston is safely avoided.

Under these conditions, the mixing faucet according to the present invention operates very satisfactorily. The operation of this faucet is extremely simple since it comprises a single control member, namely the lever or handle 18, permitting a separate adjustment of the proportions of warm water and cold water on the one hand, and the output of mixed water, on the other hand.

Due to these specific advantageous features, this faucet is applicable to many different cases. Thus, it can be used for equipping sinks and washstands or basins, and also, if desired, shower, bathtubs and, as a rule, all bathroom and sanitary installations.

However, it will readily occur to those conversant with the art that this faucet should not be construed as being strictly limited to the single form of embodiment described and illustrated herein by way of example, since many different forms of embodiment may be contemplated, provided that the main feature is maintained, namely the provision of a flange-shaped flexible gasket on the control plug, said gasket comprising two halves inclined in opposite directions, so that it is possible to vary the cross-sectional passage area of the warm water and cold water inlets by simply rotating said plug.

What I claim is:

1. Warm and cold water mixing faucet comprising an hollow body, two inlet orifices in said body respectively for warm water and cold water, these orifices being disposed at a same level but in diametrically opposite positions, a plug rotatably mounted in said body, a gasket forming flange constituting a flange-shaped rib of resilient material solid with said plug in the portion thereof registering with the warm water and cold water inlet orifices, and comprising two complementary portions having opposite inclinations and which are adapted to control said inlet orifices, an inner bore in said plug and which is adapted to constitute the outlet duct for the mixed water, and a lateral opening formed in said plug and communicating with said inner bore, a piston is mounted for axial movement in said control plug and has its end registering with said lateral opening of said plug whereby the piston movement is adapted to modify the free cross-sectional passage area provided by said opening, the piston movement being obtained by means of an external control member actuatable from the exterior.

2. Mixing faucet according to claim 1, in which the member controlling the piston for adjusting the mixed water output comprises a handle pivotally mounted about a horizontal pivot pin to one end of said rotary plug, the aforesaid handle being so mounted that it can also constitute a control member for rotating the plug about its axis.

3. Warm and cold water mixing faucet comprising an hollow body, two inlet orifices in said body respectively for warm water and cold water, these orifices being disposed at a same level but in diametrically opposite positions, a plug rotatably mounted in said body, a gasket forming flange constituting a flange-shaped rib of resilient material solid with said plug in the portion thereof registering with the warm water and cold water inlet orifices, and comprising two complementary portions having opposite inclinations and which are adapted to control said inlet orifices, an inner bore in said plug and which is adapted to constitute the outlet duct for the mixed water, and a lateral opening formed in said plug and communicating with said inner bore, said two complementary portions of said gasket-forming flange have a helical configuration but oppositely directed pitches, so that they meet at two points of reflection or cusps, the lateral opening of said rotary plug is adapted to register with one of said points of reflection or cusps where the two complementary portions of said gasket-forming flange meet, the control plug carries an external socket rotatably solid therewith and having one suitably shaped end adapted to engage a flexible sealing lip formed on the outer peripheral edge of said gasket-forming flange, on the side opposite to the outlet duct, said socket being responsive to the pressure of a resilient thrust member.

* * * * *